May 26, 1942.  W. C. SCHROEDER  2,283,955
MEANS FOR AND METHOD OF TESTING EMBRITTLEMENT CRACKING
CHARACTERISTICS OF SOLUTIONS
Filed Sept. 12, 1940   6 Sheets-Sheet 1
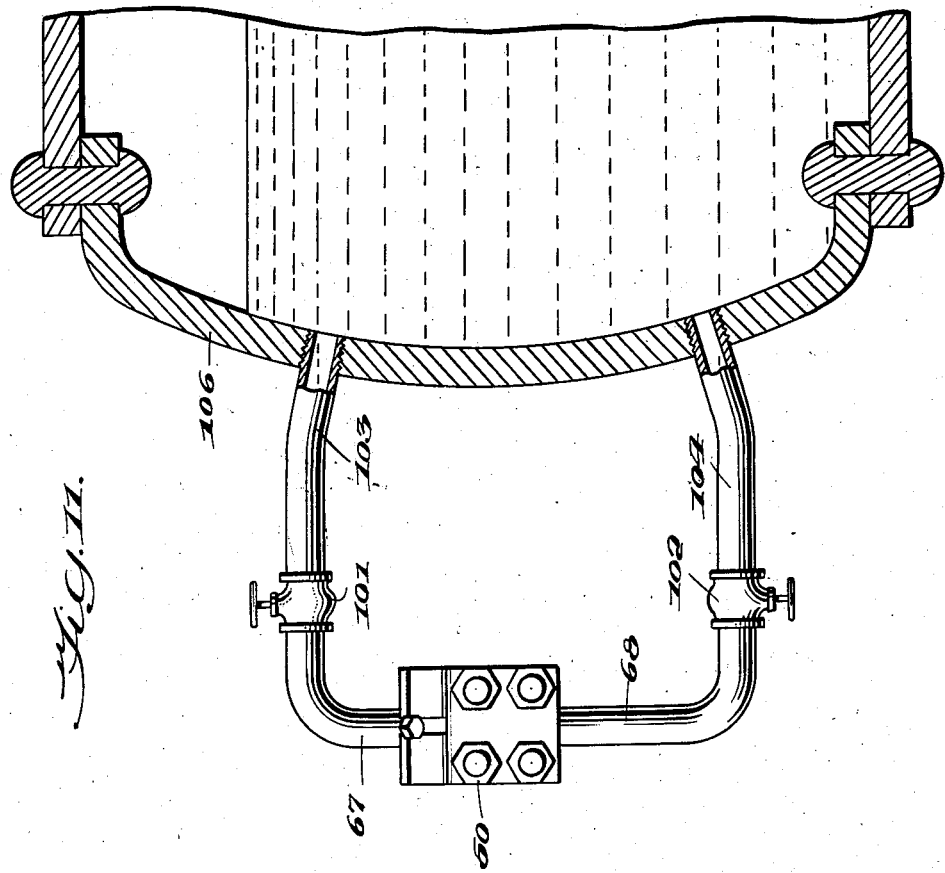
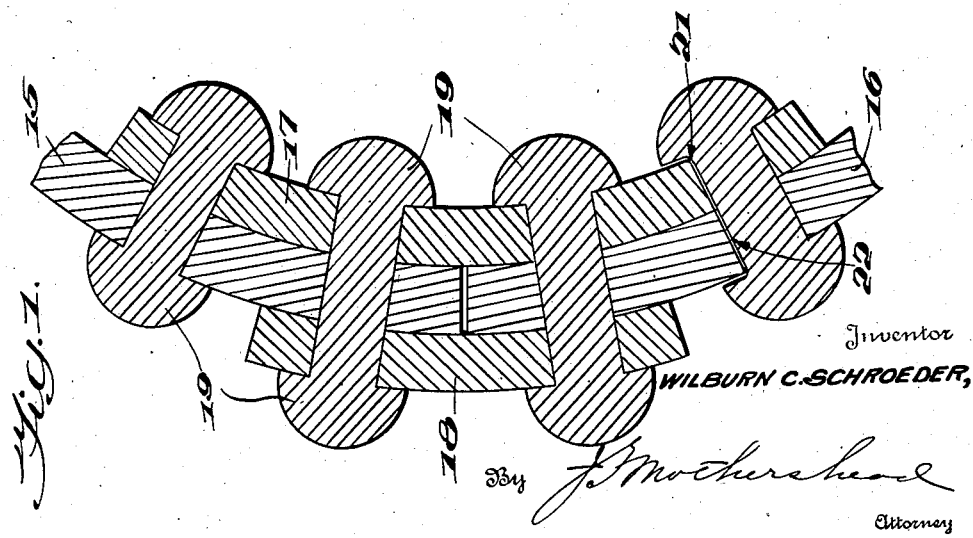
Inventor
WILBURN C. SCHROEDER,

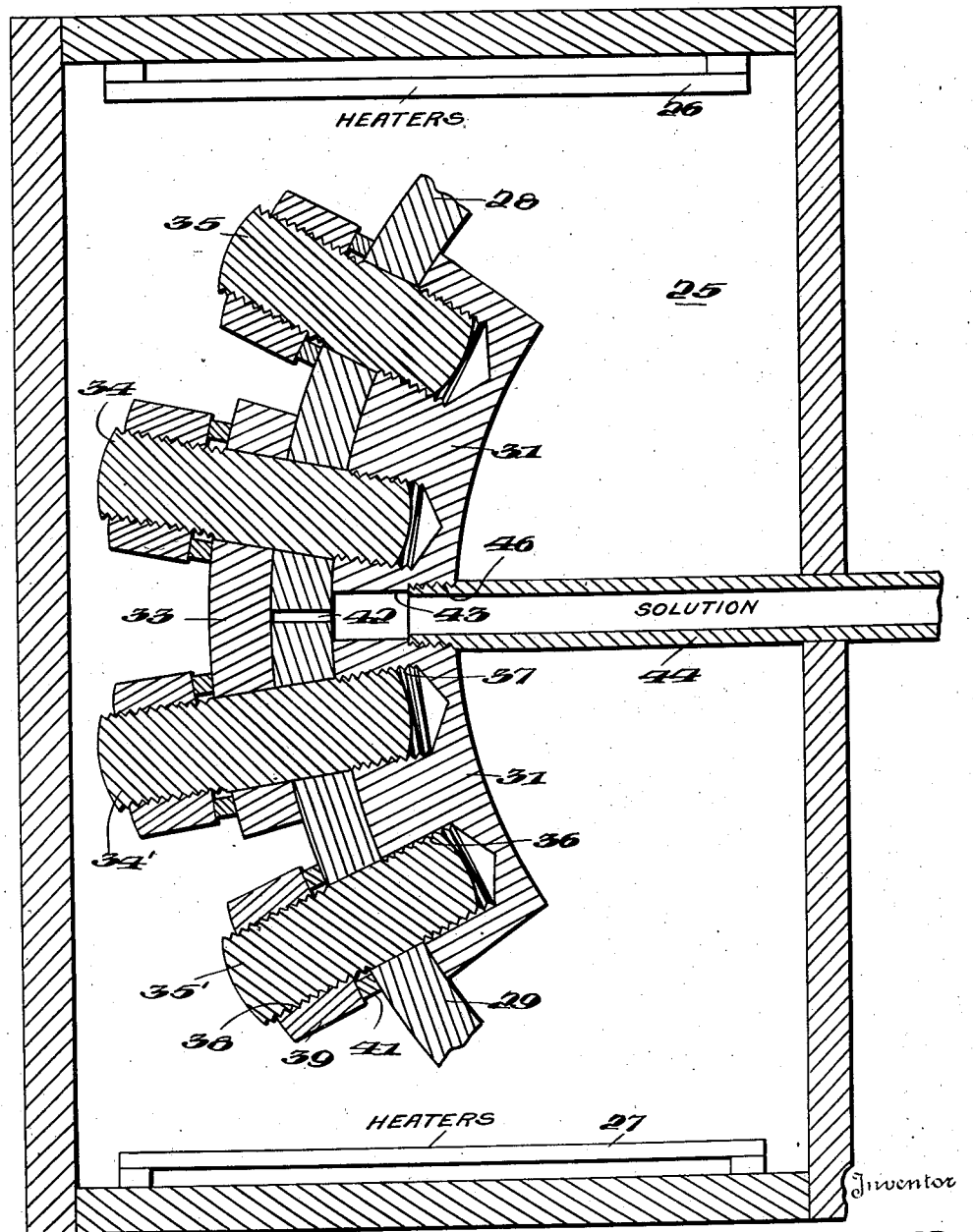

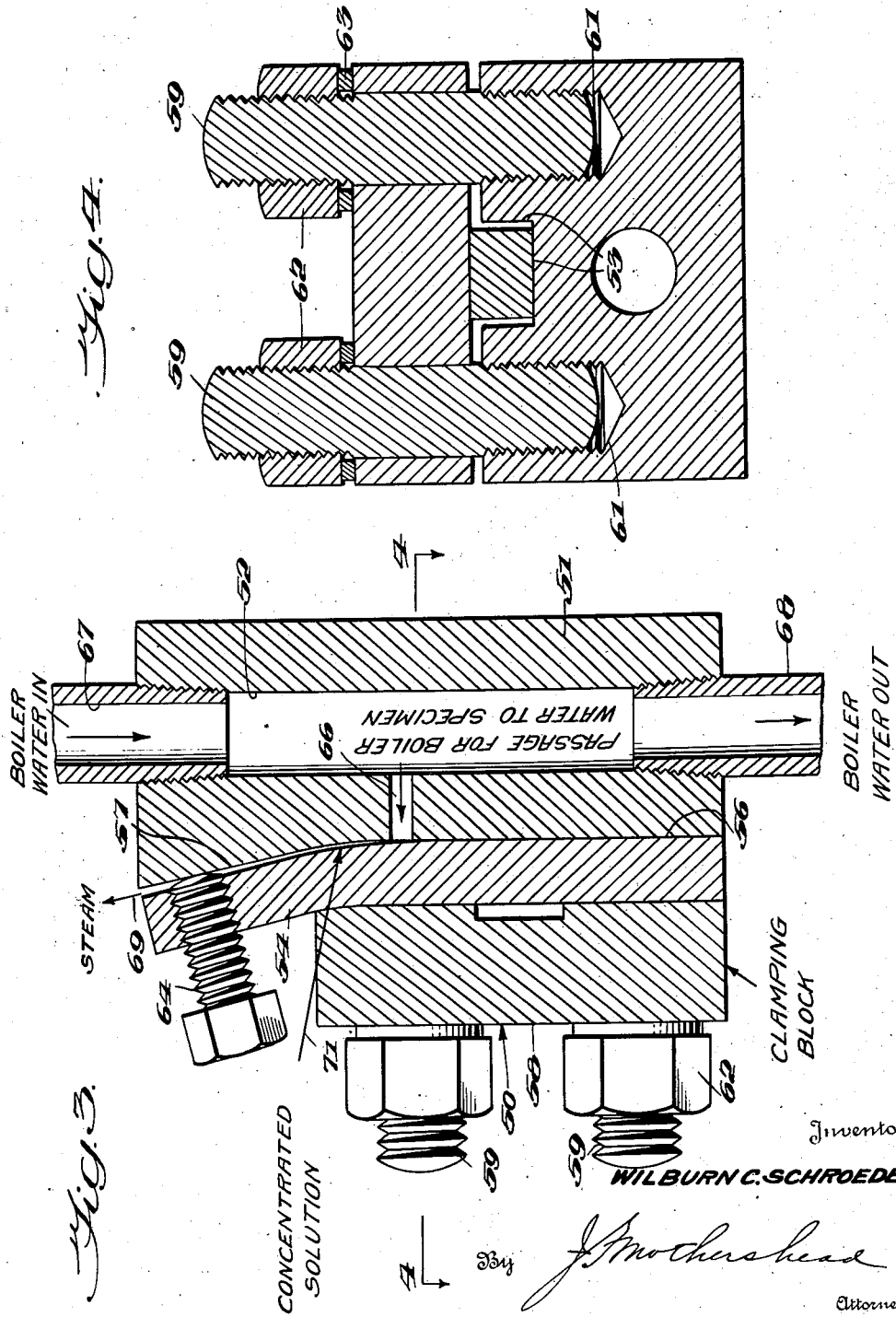

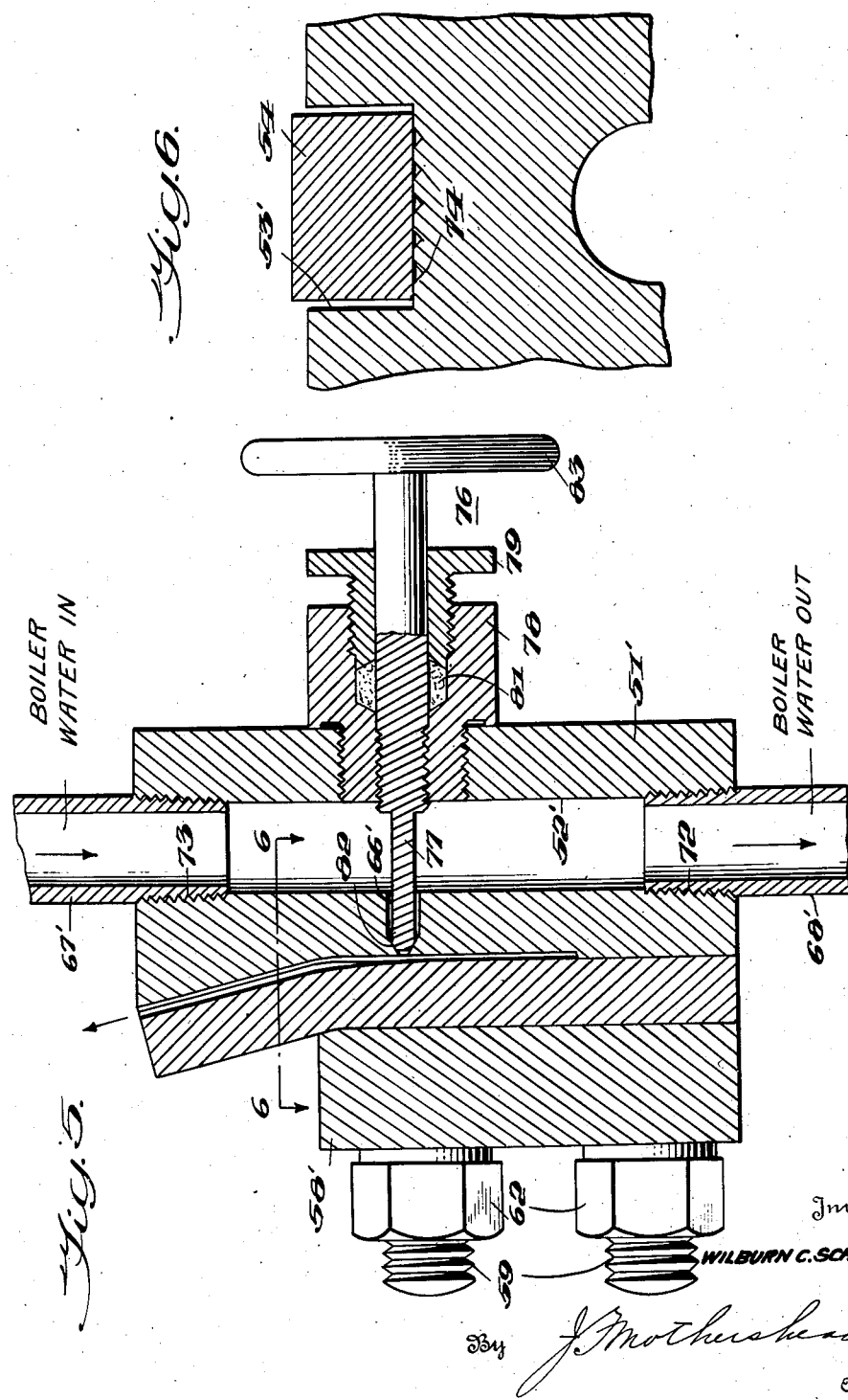

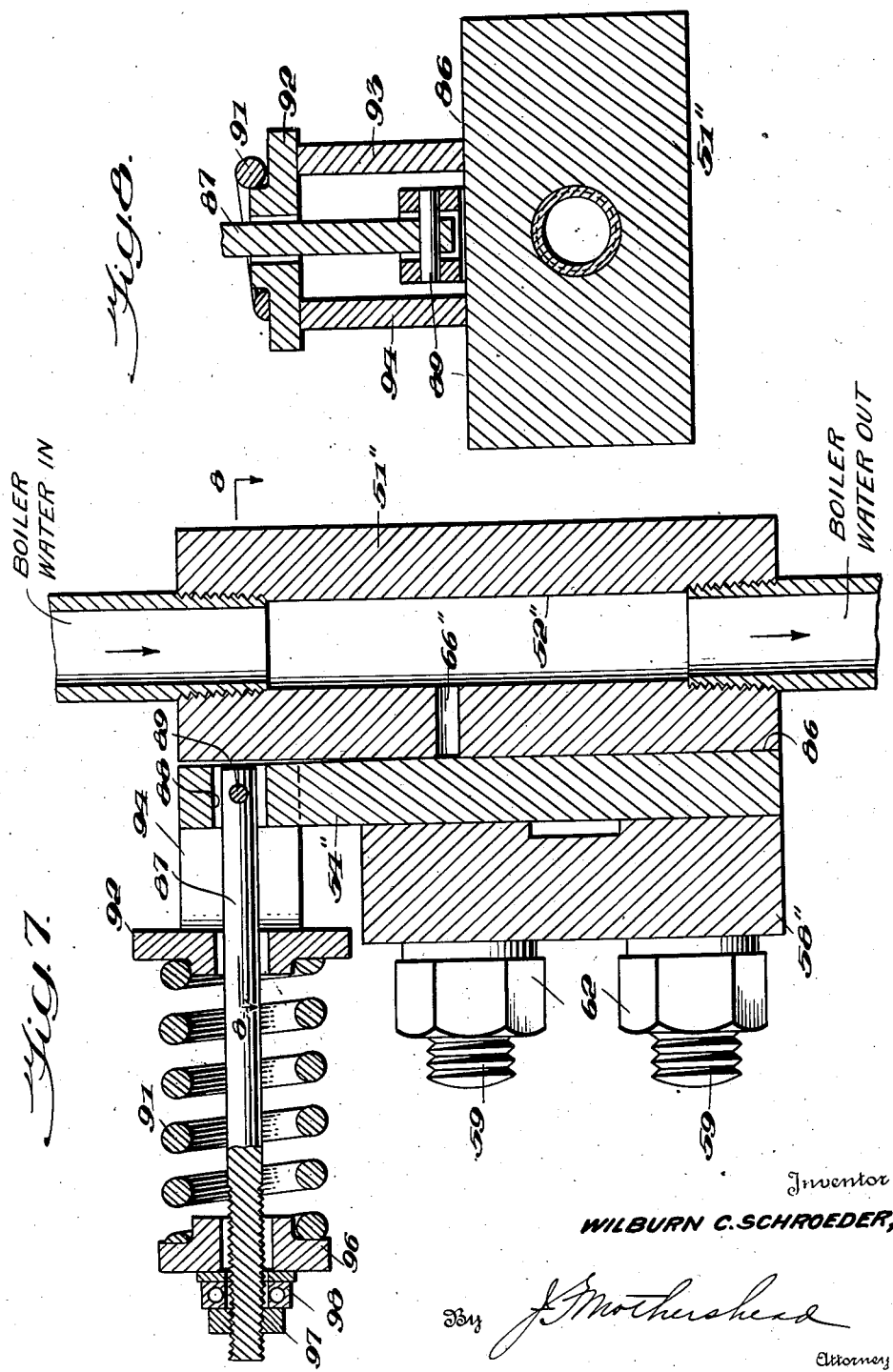

May 26, 1942.   W. C. SCHROEDER   2,283,955
MEANS FOR AND METHOD OF TESTING EMBRITTLEMENT CRACKING
CHARACTERISTICS OF SOLUTIONS
Filed Sept. 12, 1940   6 Sheets-Sheet 6
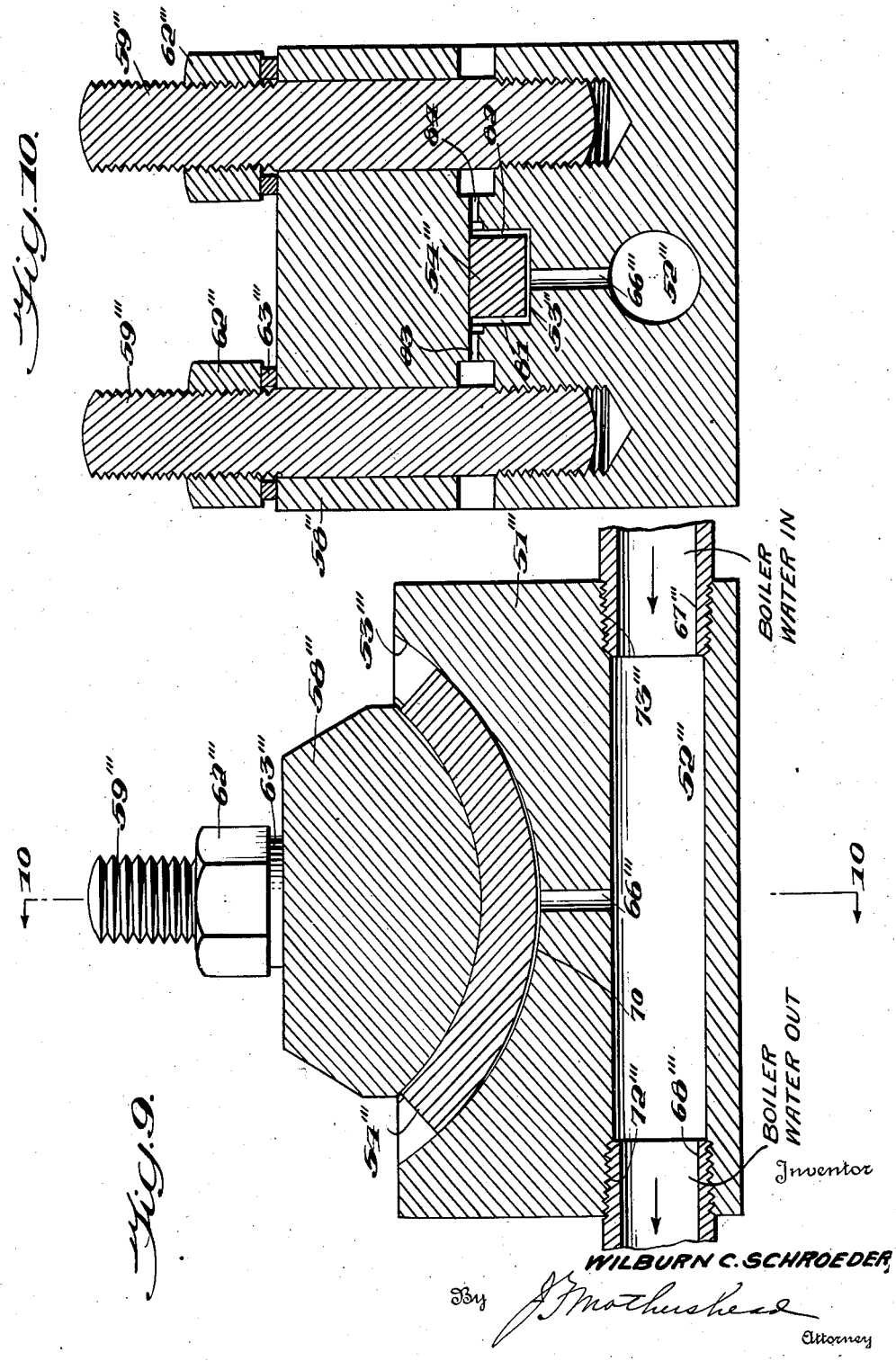
WILBURN C. SCHROEDER,
Inventor Patented May 26, 1942

2,283,955

UNITED STATES PATENT OFFICE 2,283,955

MEANS FOR AND METHOD OF TESTING EMBRITTLEMENT CRACKING CHARACTERISTICS OF SOLUTIONS

Wilburn C. Schroeder, College Park, Md., assignor to Government of United States of America as represented by the Secretary of the Interior and his successors in office Application September 12, 1940, Serial No. 356,474

12 Claims. (Cl. 73—51)

(Granted under the act of March 3, 1883, as amended April 30, 1928; 370 O. G. 757)

This invention relates to the art of testing the embrittling or intercrystalline cracking characteristics of solutions, such as water used in an operating boiler, or solutions used in other metal vessels. While my joint invention with A. A. Berk, disclosed in application Serial No. 234,722, filed October 12, 1938, for Method and apparatus for testing the embrittlement cracking characteristics of solutions, provides for testing solutions directly from the main body thereof, as from an operating boiler for any desired period at the actual conditions of temperature and pressure existing in the boiler and with boiler water identical with that used in the boiler throughout the test, the present invention provides further methods and also improved apparatus for these purposes.

Serious difficulties from embrittlement in boilers, digesters, etc., have been encountered and recognized for a number of years. Investigation has clearly shown that dilute alkaline solutions, such as used in steam boiler operation, will not cause this cracking. For example, water in a boiler will seldom contain more than a few thousand parts per million of sodium hydroxide, whereas it is necessary to have concentrations from 50,000 to 300,000 parts per million to cause cracking. It is well known that even dilute boiler waters can create these high concentrations in small spaces in riveted seams, tube-ends, etc. This fact is evident because (1) cracking is frequently encountered in these regions and (2) because the very soluble salts, sodium sulphate and sodium chloride, are often found precipitated in the spaces, which could occur only after great concentration of the boiler water. It is also well known that the embrittlement cracking characteristics of a boiler water or other dilute solution can be determined by placing a suitably stressed steel specimen in contact with a concentrated solution produced by the removal of water vapor from said boiler water, or dilute solution.

In 1930 equipment was described (Embrittlement in Boilers, by Frederick G. Straub, Bulletin 216, Engineering Experiment Station, University of Illinois, Urbana, Illinois, pages 55, 56 57, 58, 70, 71, 72, October, 1930) which concentrated an isolated sample of the solution in apparatus permitting a stress application to the specimen. In this apparatus a divided chamber contained the solution to be tested into two portions, the major amount of the solution being in the relatively large upper portion of the chamber while the lower portion thereof contained the specimen surrounded by steel fillers to create a capillary space adjacent the specimen. The desired stress was imposed by a spring and rod assembly passing through a packing gland. Heat was supplied to the solution in the capillary space in the lower end of the solution chamber to raise it to any desired test temperature by means of a suitably constructed electric heater. Concentration of the solution was accomplished by bleeding off steam from the relatively large upper portion of the solution chamber. The use of the capillary space around the specimen probably made it possible to keep highly concentrated solution (produced by other means) in contact with the specimen.

It was necessary to use a packing gland on the test equipment which has been described to allow a tensile stress to be applied to the specimen. This could cause difficulty by leaking or by sticking to create interference with the stress application. Equipment that eliminated this difficulty was described in January of 1936. (Action of solutions of sodium silicate and sodium hydroxide at 250° C. on steel under stress, W. C. Schroeder and A. A. Berk. Metals Technology, Technical Publication No. 691. January 1936.) In this case the specimen was tubular and closed at one end. This specimen was disposed vertically with its closed end uppermost and extending into a chamber which held the solution to be tested. Stress was created by a suitable system acting on a rod passing upwardly through the open lower end of the specimen and against the closed upper end thereof to apply an upward thrust against the latter end, thereby creating a tensile stress in the side walls of the specimen. This equipment was held at any desired temperature by an electric heater around the outside of the solution chamber.

In January, 1938 (Protecting steel against intercrystalline attack in aqueous solution. W. C. Schroeder, A. A. Berk and R. A. O'Brien. Trans. Am. Soc. Mec. Eng. v. 60, No. 1, pages 35–42 (1938)), other equipment was described for testing the embrittlement cracking characteristics of dilute solutions. This consisted of a steel cylinder or bomb with a depending tubular member which was closed at the bottom end. This member acted as the specimen and the walls were stressed by connection with a suitable heavy coil spring. A filler plug was placed inside the depending tubular member to create a suitable capillary space in which the solution could concentrate. Maintenance of test temperature in the unit was accomplished by means of an electric heater surrounding the bomb and depending tubular specimen. An auxiliary heating coil was also provided to aid in concentrating the solution in the capillary space and in direct contact with stressed walls of the specimen. This equipment eliminated all packing glands and provided convenient means for concentrating the dilute solution.

In 1930 (Embrittlement in Boilers, by Frederick G. Straub, Bulletin 216, Engineering Experiment Station, University of Illinois, Urbana, Illinois, pages 82, 83, 84, 85, October, 1930), it was shown experimentally with the aid of specially designed laboratory equipment that under certain conditions a dilute boiler water could concentrate in a capillary space, communicating through a restriction with a main body of solution. In a later article (Boiler-water treatment by F. G. Straub and T. A. Bradbury; Mechanical Engineering, May 1938, pages 371-377) a test mechanism apparently embodying this principle of concentrating the solution, was described. Such concentration mechanism assumed no leak toward the atmosphere, but instead, loss of steam toward the main body of the solution, or in a boiler toward the region of full boiler pressure.

On the other hand it is well known that boilers which show evidence of leaking on the outside of riveted seams, etc., are the ones most susceptible to embrittlement cracking, and yet it has not been understood how leakage outward could create concentrated solutions. This invention provides for utilizing this leakage outward, or toward a region of lower pressure, for producing concentrations requisite for determining the embrittlement cracking characteristics of the solution under test.

In the operation of a boiler it is well known that the chemical composition, temperature, and other characteristics of the water may change from time to time. In using equipment capable of testing only insolated samples of boiler water in a laboratory, it may be necessary therefore to test many small samples to determine the average effect of the water in producing embrittlement. This is inconvenient and expensive. The present invention provides for continuously testing boiler water, taken directly and continuously from an operating boiler at the conditions existing therein, with apparatus which may be sufficiently rugged to withstand rough usage and yet so simple in construction that it may be set up by unskilled men and used, for example, on a locomotive boiler while the locomotive is on a run or performing other regular service. These are highly desirable features, as a test conducted in this manner gives results due to existing temperatures and pressures as well as to any change in the composition of the boiler water caused, for example, by receiving make-up water from different sources. The apparatus has the further advantage that it may be comparatively simple in form and economical of space and, therefore, convenient and relatively inexpensive to manufacture.

An important feature of the invention resides in the adaptability of the test device for use with a test specimen of any desired size. It thus becomes possible to use a test specimen of much larger cross section than has been convenient heretofore, in embrittlement testing. This reduces and may eliminate the usually prevalent danger of cracking or failure of the specimen from purely mechanical causes, from poor machining, from non-homogeneous structure of the steel or other test material, and from chemical attack such as ordinary corrosion or rusting. Furthermore, if cracking is found, the large size of the specimen makes it reasonably certain that such cracking is due to embrittlement and also makes available larger sections of metal which are far more suitable and desirable for metallurgical and microscopic examination. Moreover, the specimen may be arranged in such a manner that its contact surface conditions are like those in a seam or other joint of a boiler, so that the tests may show the effect a boiler water may have on boiler metal when it concentrates in a boiler seam, for example. In some of the preferred embodiments of the invention the necessity for using springs, for calculating stresses, etc., is eliminated. The invention also provides improved methods for testing solutions for embrittlement cracking characteristics on a joint, such as a boiler seam, for example.

The features of the invention are illustrated in the accompanying drawings wherein:

Fig. 1 is a section through a boiler joint in the form of a riveted seam having a rivet which does not fit its hole closely;

Fig. 2 is a sectional view illustrating a heating chamber having disposed therein a joint in the form of a boiler seam having bolts for connecting elements instead of rivets and equipped with means for conducting solution to be tested to the seam;

Fig. 3 is a section through an embrittlement detector in accordance with this invention;

Fig. 4 is a section on line 4—4 of Fig. 3;

Fig. 5 is a section through another embrittlement detector in accordance with this invention, illustrating valve means for controlling the rate of flow of solution to the test specimen;

Fig. 6 is a section on line 6—6 of Fig. 5;

Fig. 7 is a section through an embrittlement detector in accordance with this invention, illustrating spring means for creating a stress in the test specimen;

Fig. 8 is a section on line 8—8 of Fig. 7;

Fig. 9 is a section through an embrittlement detector in accordance with this invention and adapted to create a substantially uniform bending stress in the test specimen;

Fig. 10 is a section on line 10—10 of Fig. 9; and

Fig. 11 is a section through a portion of a boiler drum illustrating in elevation an embrittlement detector connected to the boiler drum for continuously testing the embrittlement cracking characteristics of boiler water in said drum.

The manner in which leakage of solution outwardly through a boiler joint, or toward a region of lower pressure, may cause concentration of the solution in the joint, may be illustrated by means of the seam shown in Fig. 1. This seam may in general be of the usual construction, comprising abutting plates 15 and 16 of the boiler drum or shell, an inner plate 17 and an outer plate 18, and suitable connecting elements in the form of rivets 19 securing these plates together. As illustrated, the lowermost rivet does not fit its hole closely on one side so that boiler water can seep in under the head of this lowermost rivet, and as this seepage converges toward the shank and the rivet hole there is a definite restriction to flow outwardly at the point 21 and the boiler water passes this point only very slowly. Beyond point 21, steam can be lost in a narrow opening 22 along the shank of the rivet to the atmosphere. Therefore, because of the heat in the boiler metal and in the boiler water, the dilute boiler water slowly passing point 21 will lose steam and concentrate in the narrow channel or passage 22. If the flow past the point 21 is very slow and if sufficient steam is lost in passage or channel 22, the solution will concentrate and deposit in the narrow channel or passage 22 such soluble salts as sodium sulphate and sodium chloride. If sodium hydroxide is present in the solution, it also concentrates, but due to its high solubility, it does not necessarily crystallize out of the solution. Measurements in the laboratory have shown that dilute solutions having from 10 to 2,000 parts per million of sodium hydroxide and contained in a small boiler or vessel which is connected to a chamber or other device in which a slow leak can be established, such as that illustrated at point 21 in Fig. 1, can concentrate to more than 300,000 parts per million. This degree of concentration is at least sufficient, providing the proper chemicals and proper metal stresses are also present, to initiate intercrystalline cracking.

One of the simplest ways of testing solutions for embrittlement cracking characteristics in accordance with this invention is to provide a closed drum or vessel in which the boiler water or other dilute solution to be tested may be heated under pressure. This drum or vessel may include a joint such, for example, as a riveted seam of the type shown in Fig. 1. If leaks to the atmosphere through this joint are not evident, they may be established by localized heating of a portion of the joint to produce unequal expansion, or by mechanical force or distortion that will move the plates or rivets relative to each other to cause a slight escape of water vapor from the seam. A novel and convenient way of testing for this steam leakage is to pass a cold object, such as a piece of glass or metal over the seam and examine it for a condensed haze or droplets of water vapor. Such leakage may also be detected by passing along the seam at an approximate uniform distance a thermocouple or thermopile connected to suitable temperature measuring equipment. Escape of steam will be manifest by a rise in temperature when the thermocouple or thermopile is in its vicinity. After the test with the closed riveted vessel has been run for the desired number of days, the riveted seam may be cut open and examined for cracks. This may include visual examination, mechanical testing, macroscopic etching, microscopic examination, X-ray examination, or any other suitable method.

A section of a joint such as a seam, not necessarily part of a boiler or vessel, may also be used to determine the embrittlement cracking characteristics of the boiler water or dilute solution. As illustrated in Fig. 2, such a section must be enclosed in suitable heating equipment to maintain the desired test temperature. The apparatus illustrated in Fig. 2 comprises a closed chamber 25 formed by walls preferably of heat insulating material. This chamber may be equipped with means, such as a door (not shown) through which access may be had to the interior thereof. Heat may be applied to the space within this chamber in any suitable manner, as by means of heaters 26 and 27 mounted on the interior walls thereof. The joint to be subjected to the embrittling action of the solution to be tested may be similar to that shown in Fig. 1, and comprises sections 28 and 29 of any selected boiler drum metal and an inner plate 31 connected to an outer plate 33 and to the sections of boiler drum metal by connecting elements, preferably in the form of bolts 34, 34', 35 and 35'. The inner ends of the shank portions of these bolts may be formed with threads 36 fitting like threads 37 in tapped holes in the plate 31. The outer ends of the shanks of these bolts may be threaded as indicated at 38 to receive nuts 39 engaging washers 41 which seat on the outer surface of the sections of boiler drum metal. Preferably these sections of boiler drum metal are separated at their adjacent edges to provide a narrow passage 42 communicating with a larger passage 43 which may be in form of a substantially radially disposed hole in the inner plate 31 of this joint. Solution to be tested may be delivered to the joint at the desired pressure and temperature through a pipe section 44 extending through an outer wall of chamber 25 to bore 43. This pipe section may be connected to the bore 43 in any suitable manner, preferably by means of pipe threads 46 formed on the inner end of pipe section 44 and engaging similar threads formed in plate 31. It will be understood that a joint such as that illustrated may be supported in the chamber 25 by any suitable means (not shown).

In conducting a test with equipment such as that illustrated in Fig. 2, solution to be tested may be supplied at the desired temperature and pressure through pipe section 44 and bore 43 to the narrow passage 42 between adjacent edges of plates 28 and 29 of any selected metal. The desired leakage of this solution outwardly through this joint, or toward a region of lower pressure, may be produced and controlled advantageously by adjusting one or more of the nuts 39. This makes it possible, conveniently, to loosen any one or more of the connecting elements 34, 34', 35 and 35' to bring about the desired leakage with the assurance that if one of these connecting elements should be loosened so much that more than the desired leakage was produced, this condition may be readily corrected by tightening such connecting element or elements. It will be evident that with a seam of the type illustrated in Fig. 2, a slight loosening of one or more of the bolts is sufficient to start a diffusion of steam out of the joint. This form of joint has the further advantage that at the end of the test the bolts can be removed readily to facilitate examination of the seam for cracks. If it should be decided that the test had not proceeded far enough, the parts may be reassembled and the test may be continued. It will also be understood that the escape of steam through this joint may be detected in the same manner as previously described herein with reference to Fig. 1.

An embrittlement detector 50 suitable for use over an extended period with an operating boiler is illustrated in Figs. 3 and 4. This detector comprises a body in the form of a substantially rigid base block 51 having a relatively large passage 52 extending therethrough to form a part of a circuit through which water from the operating boiler may pass continuously. This base block may have formed on its exterior surface a longitudinal groove or channel 53 (Fig. 4) adapted to receive a test specimen 54 which may be in the form of a bar of relatively large cross section. Preferably this channel or groove 53 is formed with a straight section 56 which may be substantially parallel to passage 52 and with another straight section 57 which is inclined with respect to the straight section 56. A clamping member or block 58 may be arranged to hold the test specimen in channel 53 in any suitable manner, preferably by means of bolts 59 extending through the clamping block and engaging threaded holes 61 in the base block. The outer ends of these bolts may be fitted with nuts 62, engaging washers 63 which bear against the outer surface of the clamping block. The test specimen may be in the form of a substantially straight bar or it may be bent partially to conform to the contour of the base of groove 53. The test specimen may be arranged to extend in groove 53 beyond the clamping block and may be fitted with an adjusting screw 64 which is engageable with the base of groove or channel 53. For supplying solution from passage 52 from the test specimen, a small passage 66 may be arranged to extend through the base block from passage 52 to the base of channel 53. Pipe sections 67 and 68 threaded into opposite ends of passage 52 in the base block may be connected to an operating boiler in any suitable manner, or these pipe sections may constitute a part of the blow-off line from the boiler.

In using this detector, a straight or partially bent test specimen 54 may be disposed along channel 53 with adjusting screw 64 backed away sufficiently not to interfere with initial adjustment of this specimen. The clamping block may be forced toward the base block by tightening nuts 62 on bolts 59 and thereby forcing the test specimen into channel 53. It will be evident that if the test specimen were initially straight, this forcing action would cause it to bend substantially into the form shown and thereby create a bending stress in this specimen. Similarly, if instead of inserting an initially straight specimen in the channel 53 the specimen used is partially deformed to have a contour somewhat similar to that taken by the channel 53, then the parts should be so constructed and arranged that the tightening of nuts 62 may be sufficient to produce some bending of such deformed specimen and thereby create a bending stress therein. It will be evident that the stress so created may be controlled to some extent by adjustment of adjusting screw 64 in the outer end of the specimen.

In using the detector 50, shown in Figs. 3 and 4, the passage 52 in the base block may be connected directly to the drum of the boiler by means of the pipe sections 67 and 68, or this unit may be inserted in the blow-off line from the boiler, in which event the pipe sections 67 and 68 would constitute a part of this blow-off line. On the other hand, if this unit is used in the laboratory, it may be connected to an autoclave in such a manner that the dilute boiler water or solution will circulate through passage 52 in the base block. Preferably, this unit is so connected either to an operating boiler or to an autoclave in the laboratory that the dilute boiler water or solution will circulate through passage 52 in the base block at full temperature and pressure.

Before connecting the unit to an autoclave or to a boiler, the test specimen is disposed along groove 53 and drawn into this groove by tightening clamping nuts 62 on bolts 59 so as to force clamping block 58 toward the base block until that portion of the test specimen overlying the adjacent end of passage 66 substantially seals the outer end of this passage. After the device has been connected as desired, clamping nuts 62 may be loosened and adjusting screw 64 tightened slightly against the base block to establish a flow of steam or water vapor between the outer end of the test specimen and the base block, as indicated by the arrow 69. This flow of steam should be kept very slow in order that concentrated solution may accumulate between the base block and the test specimen in the region indicated generally by the arrow 71. This flow of steam may be detected conveniently by methods previously described herein with reference to Figs. 1 and 2.

It will be understood that during a test, solution may escape from passage 66 to channel 53 and the stressed surface of the test specimen only through the restricted opening between the test specimen and the adjacent end of passage 66. Solution so escaping from passage 66 may issue into channel 53 in a path diverging radially from passage 66 somewhat fan-like in form and extending along the adjacent surface of the test specimen, thereby providing for expansion and vaporization. As solution advances along channel 53, it will be evident that further expansion and vaporization will occur due to the wider separation of the test specimen from the base of channel 53. The spacial arrangement of the test specimen with respect to the base of channel 53 should be such that solution may escape from passage 66 into channel 53 only at a slower rate than that at which vaporization takes place. This makes it possible to obtain a high degree of concentration of solution remaining in the base of channel 53 along the surface of the test specimen.

The device shown in Fig. 3 may be allowed to run for several days, and at intervals it may be examined to see that steam continues to flow from it. If steam leakage completely stops, it may be reestablished by tightening set screw 64 slightly against the base block and, if necessary, loosening clamping nuts 62. Depending on the nature of the boiler water and the steel used for the specimen, the test may be allowed to run for one or two days, or for periods up to several months. If the specimen has not failed during the test period, it should be removed from the unit and carefully examined for cracks by one or more suitable methods. If the specimen is cracked or broken it may be concluded that this is due to embrittling characteristics of the solution or boiler water and that such solution or boiler water is capable of causing embrittlement in an operating boiler.

The modified form of embrittlement detector illustrated in Figs. 5 and 6 provides for controlling the flow of solution toward a region of lower pressure by a simple adjustment of a valve and thereby does away with the necessity of making a relatively fine or delicate adjustment with heavy bolts and clamping nuts, or the like. This embodiment comprises a base block 51' having a longitudinal passage 52' extending therethrough and threaded at 72 and 73 for connection to a boiler drum or to an autoclave as by means of pipe sections 67' and 68'. This base block may also be provided with a longitudinal channel or groove 53' to receive a test specimen 54 which may be forced into this groove or channel 53' and held there by a clamping block 58' through the use of clamping nuts 62 and bolts 59 secured in the base block in the same manner as described with reference to Figs. 3 and 4. In this embodiment however, a number of shallow grooves 74 may be formed to extend longitudinally along the surface of the test specimen adjacent the base of channel 53'. Preferably these grooves are formed in the base of the channel rather than in the surface of the test specimen. These grooves may and preferably do extend along the test specimen to the extremity of the bent end thereof as shown (at top Fig. 5), but they should not extend all the way to the opposite end of the specimen as this would permit vaporization of solution along the straight, vertical portion of the specimen which, in the form shown, is not subjected to as great a bending stress as the bent end thereof shown at the top in Fig. 5.

The rate of flow of solution from passage 52' in the base block to the surface of the test specimen may be controlled by means of a valve 76 comprising a valve stem 77 having threaded engagement with a sealing nut 78 mounted in the base block. A packing gland 79 may be mounted in the sealing nut 78 about valve stem 77 and suitable packing 81 may be disposed between the sealing nut and the gland. This valve stem extends into a passage 66' having a seat 82 against which the inner end of the valve stem may form a seal. A hand wheel 83 may be mounted on the outer end of this valve stem for operating the latter. While valve 76 has been illustrated as being mounted in the base block, it will be understood that this valve may be mounted in other ways as, for example, the valve stem 77 may be brought in through the clamping block and test specimen to control the boiler water outlet if desired.

In the embodiment shown in Figs. 5 and 6 the shallow grooves 74 in the base of channel or groove 53' allow passage of solution and steam under the test specimen even when it is clamped tightly in the base of groove 53' The rate of flow of solution from passage 52' through passage 66' to the surface of the test specimen may be controlled by adjusting hand wheel 83 of valve 76, as will be understood.

In using the device illustrated in Figs. 5 and 6, the test specimen may be secured in place and the test may be conducted in substantially the same manner as previously described herein with reference to the device shown in Figs. 3 and 4. It will be evident that in using this device the desired restriction of flow of solution to the test specimen may be established by adjusting valve 76, and that in other respects this device functions in substantially the same manner as the embodiment illustrated in Figs. 3 and 4.

Figs. 7 and 8 illustrate an embodiment of the invention which provides for the application of a definite and controlled bending stress to the specimen, but in other respects this embodiment may be similar to those previously described with reference to Figs. 3 to 6, inclusive. As illustrated, this embodiment comprises a base block 51" having a longitudinal passage 52" extending therethrough and a passage 66" extending from passage 52" to the surface of test specimen 54". In this form the groove 53 of the previous embodiments is omitted and a clamping block 58" engages the test specimen 54" for forcing the latter against a flat exterior surface 86 of the base block. This is accomplished by means of clamping nuts 62 on bolts 59 mounted in the base block, as described with reference to Figs. 3 and 4.

For applying bending stress to the specimen, a rod 87 may extend into a recess or bore 88 in the outer end of the specimen and be mounted, on a transverse pin 89 carried by the specimen, for pivotal movement in a plane parallel to the longitudinal center line of the specimen. A relatively heavy compression loading spring 91 may be disposed about this rod and engage an inner spring seat 92 to which struts 93 and 94 are connected and spaced to straddle the specimen. This spring seat and the struts connected thereto constitute a platform for supporting the inner end of the loading spring against the base block.

The outer end of the loading spring may engage a seat 96 disposed about rod 87. The degree of compression of this spring may be controlled by a nut 97 threaded on the outer end of rod 87, and engaging a thrust bearing 98 interposed between spring seat 96 and this nut. It will be understood that as nut 97 is adjusted longitudinally of rod 87, the compression of the loading spring will be varied, and this will vary the tension in rod 87 which, due to its connection with the outer end of the specimen through pin 89, will vary the bending stress created in this test specimen. While loading spring 91 and its associated parts have been illustrated as being arranged to produce a bending stress in the test specimen, it will be apparent from this disclosure that this spring, or a similar one, may be arranged to produce a tensile instead of a bending stress in the test specimen without departing from this invention. In all other respects this embodiment may be used in the same manner as described with reference to the embodiment illustrated in Figs. 3 and 4.

The embodiment illustrated in Figs. 9 and 10 provides for applying a substantially uniform bending stress to the specimen lengthwise thereof. As illustrated, this embodiment comprises a substantially rigid base block 51''' having a passage 52''' extending longitudinally therethrough and threaded at its outer ends, as indicated at 72''' and 73''' for connection to pipe sections 67''' and 68''' adapted to supply and discharge boiler water or solution to or from this passage. In this form of the invention the specimen-receiving groove or channel 53''' is curved longitudinally, preferably to follow an arc of a circle, and the clamping block 58''' has its inner face formed approximately complementary to the outer edge of this groove or channel so that this clamping block may be effective for forcing the test specimen 54''' into the desired cooperative relationship with the base of channel 53'''. Only two, instead of four bolts 59''' are mounted to extend through the clamping block on each side of channel 53''' into threaded holes in base block 51''', as previously disclosed herein with respect to the four bolts 59 of Figs. 3 and 4. Clamping nuts 62''' mounted on bolts 59''' engage washers 63''' which bear against the outer surface of base block 58''' for transmitting pressure applied to nuts 62''' through base block 58''' to test specimen 54'''. A passage 66''' may also be arranged to extend between passage 52''' and the base of channel 53''' for conducting boiler water or solution to the surface of the test specimen disposed in groove 53'''.

In this form of the invention an arcuate space 70 between the underside of the test specimen and the base of channel 53''' functions as a restriction to retard the flow of solution from passages 52''' and 66''' toward a region of lower pressure so that vaporization may take plate at a greater rate than that at which solution can be supplied to space 70. Furthermore, concentration of solution occurs in this same arcuate space 70 which functions as a means for retarding the flow of solution. It will be seen from Fig. 10 that the test specimen is not as wide as channel 53''' and that base block 51''', clamping block 58''' and the test specimen are so proportioned and arranged that opposing surfaces of the base block and the clamping block (Fig. 10) never can come together to close the space along the sides of the test specimen. This leaves passages 81, 82 from space 70 along each side of the test specimen and channel 53''' and passages 83, 84 between opposing surfaces of the base block and the clamping block through which steam may escape to atmosphere. It will be understood that space 70 between the test specimen and the base of channel 53''' for concentration of solution, may be varied by adjusting nuts 62''' on bolts 59'''. Preferably, space 70 does not extend along the test specimen for the full length thereof, but terminates within the length of the latter so as to avoid the possibility of having solution or constituents thereof escape at an excessive rate lengthwise of channel 53''' across the ends of the test specimen.

It will be seen that the curvature of groove 53''' and the inner face of base block 58''' provides for bending substantially equally each increment of the test specimen taken lengthwise thereof and thereby applying to and creating in the test specimen a substantially uniform bending stress. In all other respects this embodiment may be used in the same manner as embodiments previously described herein with reference to other embodiments of this embrittlement detector.

While several forms of the embrittlement detector have been illustrated in Figs. 3 to 10 inclusive, it will be apparent to those skilled in the art when informed by this specification that various modifications of these illustrated embodiments may be made without departing from this invention. For instance, a valve, as illustrated in Fig. 5, with or without the shallow grooves 74 of that figure, may be incorporated in the other illustrated embodiments of this detector. A definite and controlled bending stress may be applied to specimens used with the embodiments illustrated in Figs. 3, 4, 5, 6, 9 and 10 by spring loading means, such, for example, as that illustrated in Figs. 7 and 8. It will also be seen that means for applying substantially uniform bending to the specimen lengthwise thereof, as illustrated in Figs. 9 and 10, may be incorporated in any of the other illustrated embodiments of this embrittlement detector. Various other modifications will occur to those conversant with this art.

The manner in which an embrittlement detector may be connected for a continuous test is illustrated in Fig. 11. In this view an embrittlement detector 50 of the type illustrated in Figs. 3 and 4 has its pipe sections 67 and 68 connected through valves 101 and 102 and pipe sections 103 and 104 to the water space of a closed vessel, such as an operating boiler 106. It will be seen that boiler water at the pressure and temperature existing in the boiler may be conducted through pipe 103, valve 101, pipe section 67 to embrittlement detector 50, and this boiler water or solution may be discharged from this embrittlement detector through pipe section 68, valve 102, and pipe section 104, back to the boiler.

The term "restriction" is used herein and in the claims in its broad sense to cover a means for restricting flow of solution and thereby retarding such flow below the rate at which evaporation takes place. This may be accomplished by means of an orifice or by a passage having such a small bore or cross-sectional flow area and such a length as to produce the same result of retarding the flow to a slower rate than that at which solution evaporates on escaping therefrom to a region of lower pressure communicating therewith.

The term "joint" is also used herein and in the claims in its broad sense to cover any of the well-known types of joints used in the construction of boilers or similar metal vessels such as digesters, etc. Such a joint may comprise a seam of the types illustrated in Figs. 1 and 2, or the connection of a tube to a tube sheet, or the joint may consist of only a single element passing through a hole in the boiler shell, as for example, a bolt passing through the boiler shell for supporting a brace, or for any other purpose.

The invention described herein, if patented, may be manufactured and used by or for the Government for governmental purposes without the payment to me of any royalty thereon.

I claim as my invention:

1. The method of the class described which comprises assembling plates to form a seam, securing the plates in their assembled relation by means of adjustable and readily detachable attaching elements, such as bolts and nuts as distinguished from permanent attaching elements such as rivets, subjecting one side of the seam to a body of solution under pressure which may produce embrittlement cracking, subjecting the other side of the seam to a fluid pressure below that of the body of solution, adjusting one or more of said attaching elements to provide a slow leakage from the body of solution through the seam, maintaining these conditions for a test period, then separating the seam from the body of solution and loosening the attaching elements to permit inspection of the parts of said seam.

2. The method of the class described which comprises assembling plates to form a seam, securing the plates in their assembled relation by means of adjustable and readily detachable attaching elements, such as bolts and nuts as distinguished from permanent attaching elements such as rivets, subjecting one side of the seam to a body of solution under pressure which may produce embrittlement cracking, subjecting the other side of the seam to a fluid pressure below that of the body of solution, adjusting one or more of said attaching elements until a slow leakage from the body of solution through the seam may be detected by testing said other side of said seam for the escape of steam sufficient to produce observable condensation on a sold surface or to raise the temperature reading of a temperature responsive instrument, maintaining these conditions for a given period or until the seam fails, then separating the seam from the body of solution and loosening the attaching elements to permit inspection of the parts of said seam.

3. The method of testing a solution for embrittlement cracking characteristics, which comprises providing a joint of assembled members having engageable areas, using one of said members as a test specimen, creating a stress in said test specimen, delivering from a main body of solution to be tested a substantially continuous flow of solution to one side of said joint at substantially the temperature and pressure prevailing in said main body of solution, subjecting the other side of said joint to a region of fluid pressure lower than that of the solution delivered to said one side of said joint, effecting sufficient separation of the test specimen and another member of said joint to provide adjacent a stressed area of the test specimen a restriction through which solution may pass from said one side of said joint only at a slower rate than solution escaping through said restriction evaporates under the influence of said region of lower fluid pressure, so that solution may concentrate by evaporation to said region of lower fluid pressure as it passes over said stressed area of said test specimen.

4. Apparatus of the class described, comprising a body having a passage therein for solution to be tested, means providing a circulatory system disposed outside of an operating boiler for conducting solution from the operating boiler to said passage and for returning solution from said passage to the operating boiler, a test specimen disposed outside said body and adjacent an exterior wall thereof to define therewith a restriction communicating on one side thereof with a passage in which solution may vaporize on passing said restriction, means for securing the test specimen in this position, and means for conducting solution from the passage in said body to the other side of said restriction.

5. Apparatus of the class described, comprising a body having a passage therein for solution to be tested, a test specimen disposed outside said body and adjacent an exterior wall thereof to define therewith a restriction communicating on one side thereof with a passage for the escape of vapor, means for securing the test specimen in this position, means for creating a stress in said test specimen, and means for conducting solution from the passage in said body to the other side of said restriction.

6. Apparatus of the class described, comprising a body having a passage therein for solution to be tested, a test specimen disposed outside said body and adjacent an exterior wall thereof to define therewith a restriction communicating on one side thereof with a passage for the escape of vapor, means for securing the test specimen in this position, means cooperating with said body for creating a stress in said test specimen, and means for conducting solution from the passage in said body to the other side of said restriction.

7. Apparatus of the class described, comprising a body having a passage therein for solution to be tested, a test specimen disposed outside said body and adjacent an exterior wall thereof to define therewith a restriction communicating on one side thereof with a passage for the escape of vapor, means for securing the test specimen in this position, means cooperating with said body for varying the size of said restriction and said passage for the escape of vapor and creating a stress in said test specimen, and means for conducting solution from the passage in said body to the other side of said restriction.

8. Apparatus of the class described, comprising a body having a passage extending therethrough for conducting solution to be tested, a test specimen disposed along an exterior wall of said body to define therewith a narrow passage, means for securing the test specimen in this position, means providing a restriction communicating with said narrow passage, means for conducting solution from said passage which extends through said body to said restriction, and means for controlling the flow of solution through said restriction.

9. Apparatus of the class described, comprising two members, one of said members comprising a body having a passage therethrough for conducting solution to be tested, the other of said members comprising a test specimen disposed along an exterior wall of said body, one of these members having one or more shallow grooves extending along said exterior wall and said test specimen to provide a narrow passage therebetween, said body having another passage extending from said passage therethrough to said narrow passage between said body and said test specimen, said another passage having a valve seat therein, and a valve engageable with said seat and mounted on said body.

10. Apparatus of the class described, comprising a substantially rigid body and a test specimen having different contours, means for forcing said body and said test specimen sufficiently together to leave only a narrow passage therebetween and to create a substantially uniform bending stress in said test specimen, and means for conducting solution to be tested to said narrow passage.

11. Apparatus of the class described, comprising a substantially rigid body and a clamping member having cooperating opposed surfaces shaped to define therebetween a longitudinally curved slot for creating a substantially uniform bending stress in a substantially straight test specimen when the latter is forced therein, means for forcing a substantially straight test specimen into said slot so as to leave a narrow passage between said specimen and one wall of said slot, and means for conducting solution to be tested to said narrow passage.

12. Apparatus of the class described, comprising a body, a test specimen disposed along said body, a clamping member for securing the test specimen to said body to define therewith a narrow passage, said body and said clamping member having cooperating surfaces engageable with substantially opposite sides of said test specimen for creating a substantially uniform bending stress therein when said test specimen is secured to said body by said clamping member so as to leave a narrow passage between said test specimen and said body, and means for conducting solution to be tested to said narrow passage.

WILBURN C. SCHROEDER.